(12) United States Patent
Wen et al.

(10) Patent No.: US 11,703,742 B2
(45) Date of Patent: Jul. 18, 2023

(54) IMAGE CAPTURING DEVICE

(71) Applicant: Acer Incorporated, New Taipei (TW)

(72) Inventors: Chun-Hung Wen, New Taipei (TW);
Chun-Hsien Chen, New Taipei (TW);
Hui-Ping Sun, New Taipei (TW);
Yen-Chou Chueh, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/704,029

(22) Filed: Mar. 25, 2022

(65) Prior Publication Data

US 2022/0373864 A1 Nov. 24, 2022

(30) Foreign Application Priority Data

May 20, 2021 (TW) ................................ 110118268

(51) Int. Cl.
*H04N 23/50* (2023.01)
*G03B 11/04* (2021.01)

(52) U.S. Cl.
CPC .......... *G03B 11/043* (2013.01); *H04N 23/50* (2023.01)

(58) Field of Classification Search
CPC ...... G03B 11/043; H04N 23/50; H04N 23/51; H04N 23/55; H04N 23/57
See application file for complete search history.

(56) References Cited

U.S. PATENT DOCUMENTS

| 2010/0053372 | A1* | 3/2010 | Shimizu | ................. H04N 23/88 348/231.3 |
| 2017/0180617 | A1* | 6/2017 | Haddad | ................ G10K 11/002 |
| 2019/0230262 | A1* | 7/2019 | Wang | ................. G02B 27/0977 |
| 2020/0264495 | A1* | 8/2020 | Zhuo | ........................ G03B 9/06 |
| 2021/0081003 | A1 | 3/2021 | Bristol et al. | |

FOREIGN PATENT DOCUMENTS

| KR | 20050006690 | 1/2005 |
| WO | 2020068099 | 4/2020 |

* cited by examiner

Primary Examiner — Mekonnen D Dagnew
(74) Attorney, Agent, or Firm — JCIPRNET (57) ABSTRACT

An image capturing device including a casing, an image capturing module disposed in the casing, a positioning member slidably disposed in the casing, a memory alloy spring disposed in the casing, a restoring spring disposed in the casing, a shielding member corresponding to the image capturing module and slidably disposed in the casing, and a switch slidably disposed on the casing and connected to the shielding member is provided. Two ends of the memory alloy spring are respectively connected to the positioning member and the casing. Two ends of the restoring spring are respectively connected to the positioning member and the casing, and the memory alloy spring and the restoring spring are respectively located at two opposite sides of the positioning member. The shielding member is connected to the positioning member and is configured to block or unblock a light path of the image capturing device.

13 Claims, 8 Drawing Sheets

IMAGE CAPTURING DEVICE

CROSS-REFERENCE TO RELATED APPLICATION

This application claims the priority benefit of Taiwan application serial no. 110118268, filed on May 20, 2021. The entirety of the above-mentioned patent application is hereby incorporated by reference herein and made a part of this specification.

BACKGROUND

Technical Field

The disclosure relates to an image capturing device, and more particularly relates to an image capturing device with a privacy protection design.

Description of Related Art

Common portable electronic devices (e.g., smartphones, tablet computers, or notebook computers) mostly have image capturing functions. Normally, the image capturing module is in an off-state, but an ill-intentioned person (e.g., a cyber hacker) can still breach the portable electronic device through the Internet and control the image capturing module to remotely obtain the user's private image, which thus causes privacy leak.

SUMMARY

The disclosure provides an image capturing device capable of preventing privacy leak.

The disclosure provides an image capturing device including a casing, an image capturing module disposed in the casing, a positioning member slidably disposed in the casing, a memory alloy spring disposed in the casing, a restoring spring disposed in the casing, a shielding member corresponding to the image capturing module and slidably disposed in the casing, and a switch slidably disposed on the casing and connected to the shielding member. Two ends of the memory alloy spring are respectively connected to the positioning member and the casing. Two ends of the restoring spring are respectively connected to the positioning member and the casing, and the memory alloy spring and the restoring spring are respectively located at two opposite sides of the positioning member. The shielding member is connected to the positioning member. In an open state, the shielding member unblocks a light path of the image capturing module, and the memory alloy spring has a first length. In a closed state, the shielding member blocks the light path of the image capturing module, and the memory alloy spring has a second length greater than the first length.

Based on the above, in the image capturing device of the disclosure, the shielding member may block the light path of the image capturing module, so that the image capturing module cannot receive the external light. When the light path of the image capturing module is blocked by the shielding member, even if someone (e.g., a cyber hacker) breaches the image capturing device through the Internet and controls the image capturing module, they cannot remotely obtain the user's private image, so it is possible to prevent privacy leak.

To make the aforementioned more comprehensible, several embodiments accompanied with drawings are described in detail as follows.

DESCRIPTION OF THE EMBODIMENTS

Figure 1A:
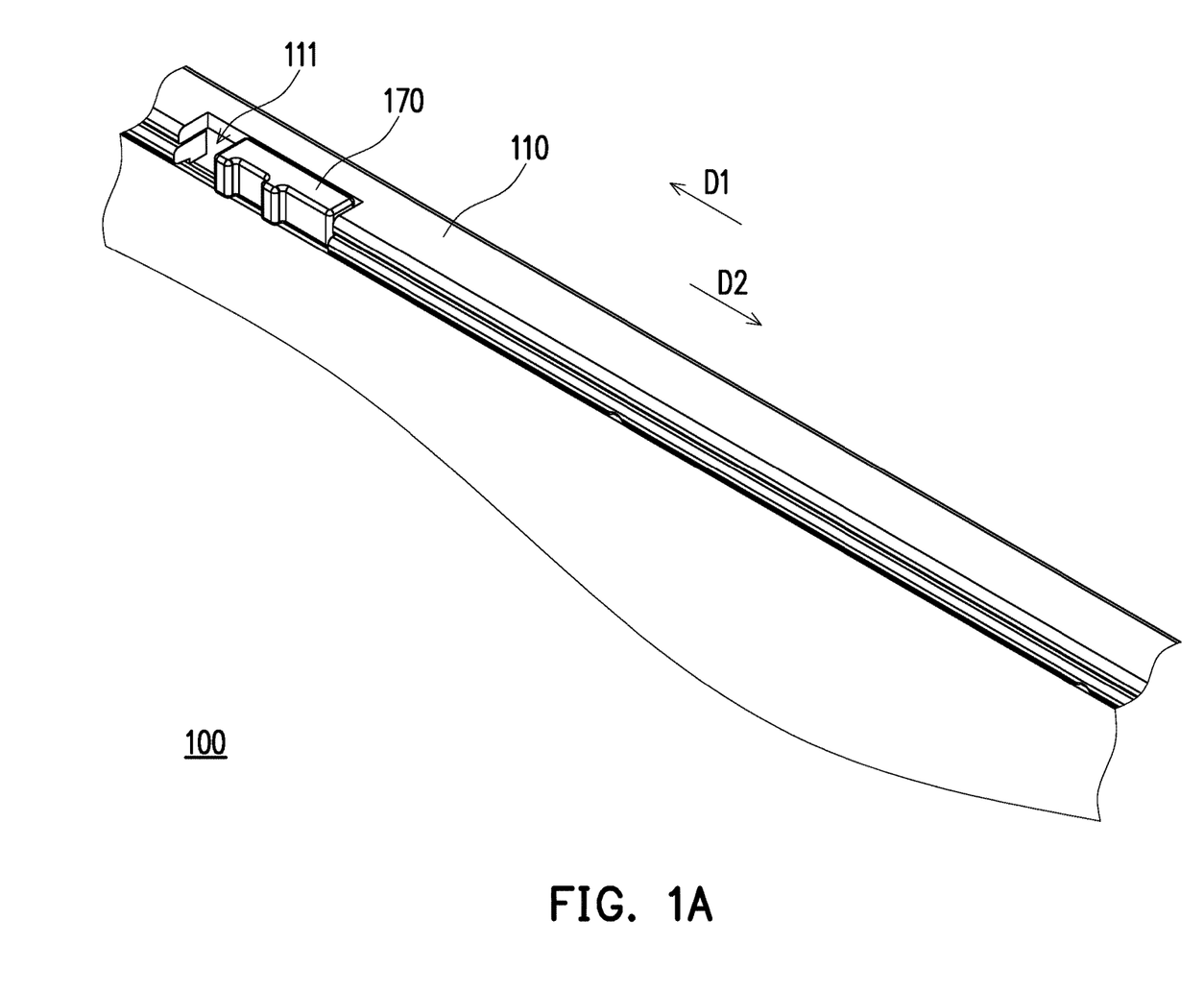
FIG. 1A is a schematic partially enlarged view of an image capturing device in an open state according to an embodiment of the disclosure.
Figure 1B:
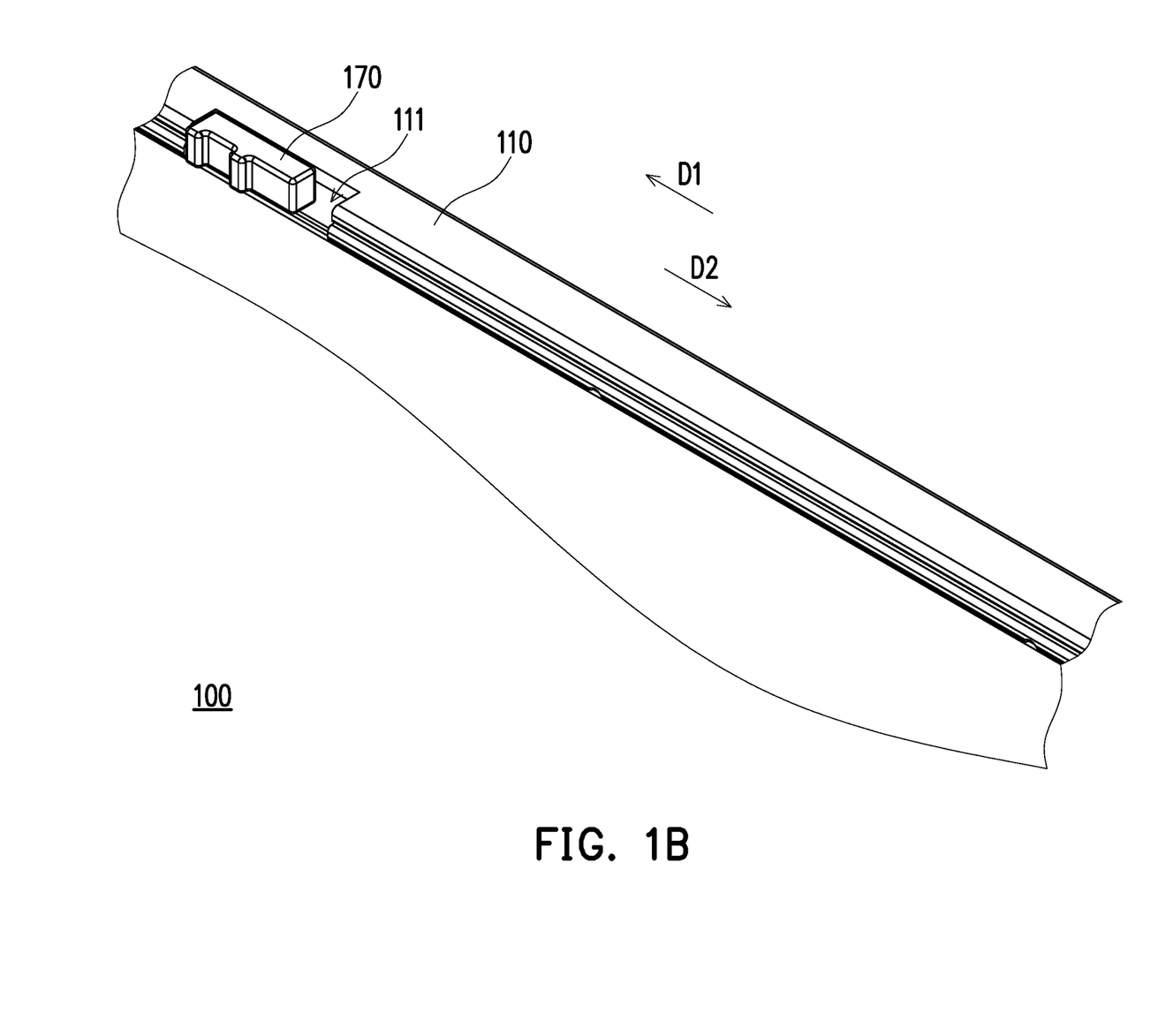
FIG. 1B is a schematic partially enlarged view of an image capturing device in a closed state according to an embodiment of the disclosure.
Figure 2A:
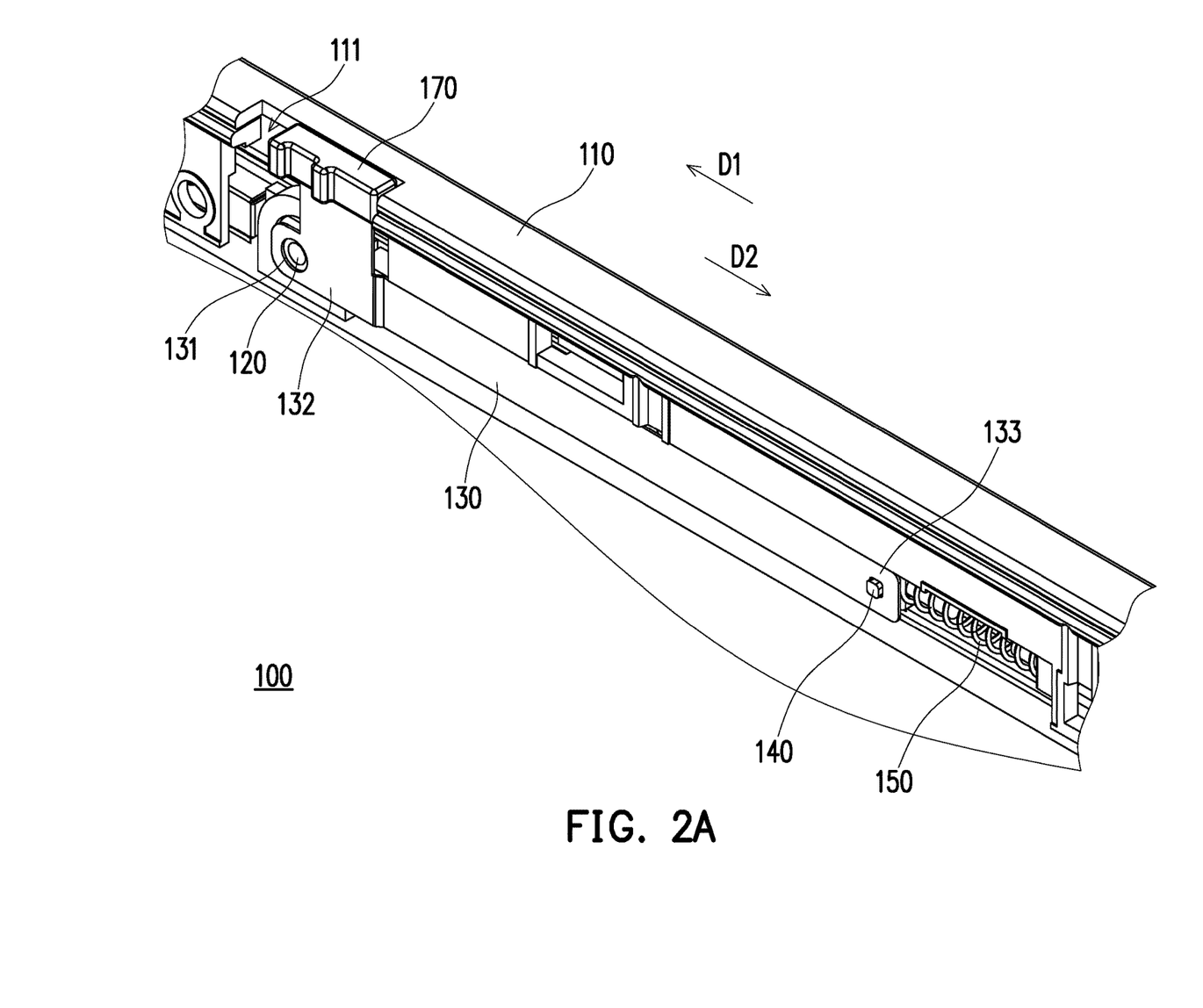
FIG. 2A is a schematic partially omitted view of the image capturing device of FIG. 1A.
Figure 2B:
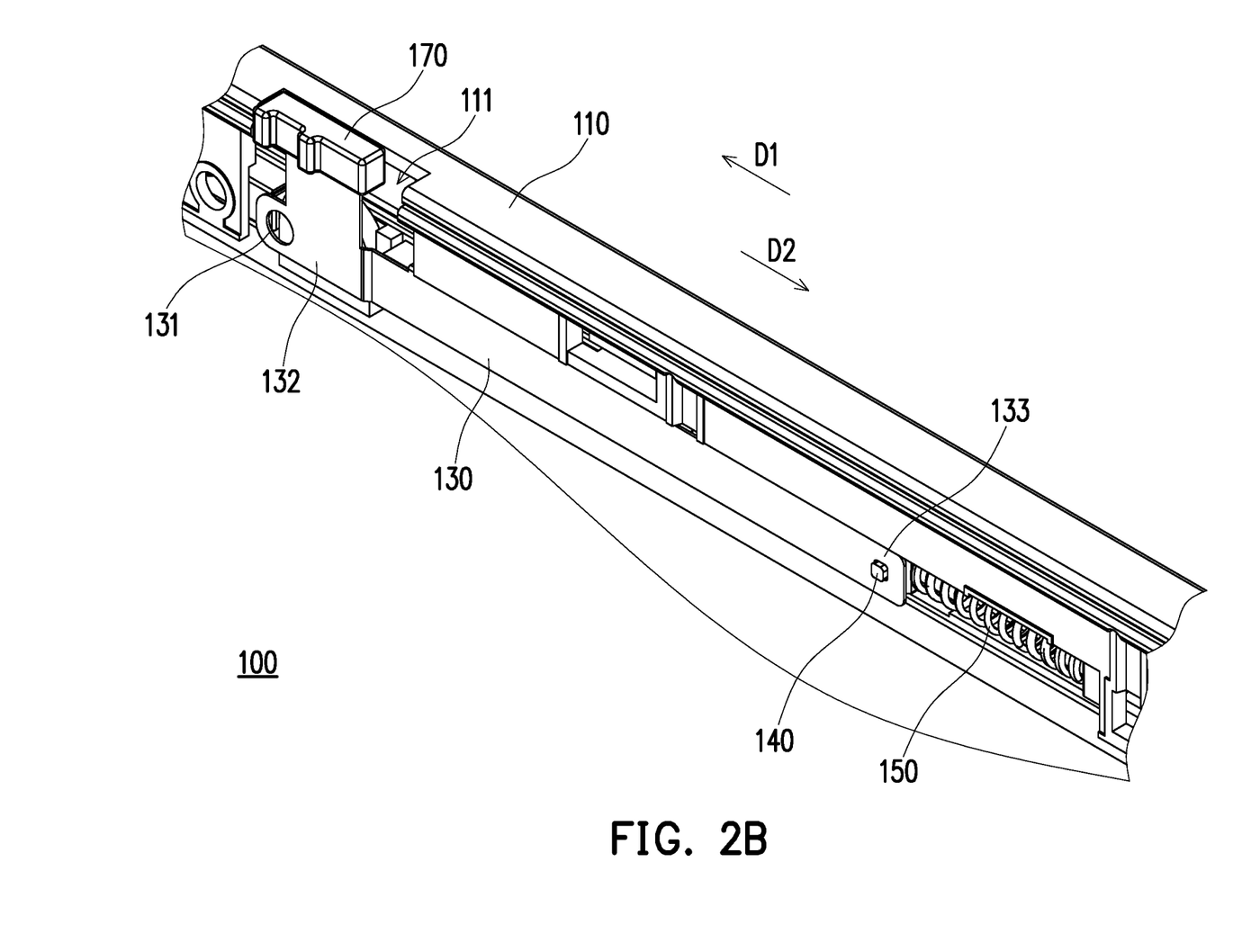
FIG. 2B is a schematic partially omitted view of the image capturing device of FIG. 1B.

FIG. 1A is a schematic partially enlarged view of an image capturing device in an open state according to an embodiment of the disclosure. FIG. 1B is a schematic partially enlarged view of an image capturing device in a closed state according to an embodiment of the disclosure. FIG. 2A is a schematic partially omitted view of the image capturing device of FIG. 1A. FIG. 2B is a schematic partially omitted view of the image capturing device of FIG. 1B. Referring to FIG. 1A and FIG. 1B, in this embodiment, an image capturing device 100 may be part of a portable electronic device, and the portable electronic device may be a smartphone, a tablet computer, or a notebook computer.

Referring to FIG. 1A and FIG. 2A, the image capturing device 100 includes a casing 110, an image capturing module 120, and a shielding member 130. The image capturing module 120 and the shielding member 130 are both disposed in the casing 110, and the shielding member 130 is slidable with respect to the casing 110 and the image capturing module 120. The shielding member 130 is disposed corresponding to the image capturing module 120, and the image capturing module 120 is located at one side (e.g., the rear side) of the sliding path of the shielding member 130. In the open state shown in FIG. 2A, the shielding member 130 unblocks the light path of the image capturing module 120. In other words, the light path of the image capturing module 120 is not blocked by the shielding member 130, so the image capturing module 120 may receive the external light.

In the switching process from the open state shown in FIG. 2A to the closed state shown in FIG. 2B, the shielding member 130 slides in a first direction D1 with respect to the casing 110 and the image capturing module 120 and blocks the light path of the image capturing module 120, so that the image capturing module 120 cannot receive the external light. As shown in FIG. 2B, when the light path of the image capturing module 120 is blocked by the shielding member 130, even if someone (e.g., a cyber hacker) breaches the image capturing device 100 through the Internet and controls the image capturing module 120, they cannot remotely obtain the user's private image, so it is possible to prevent privacy leak.

Figure 3A:
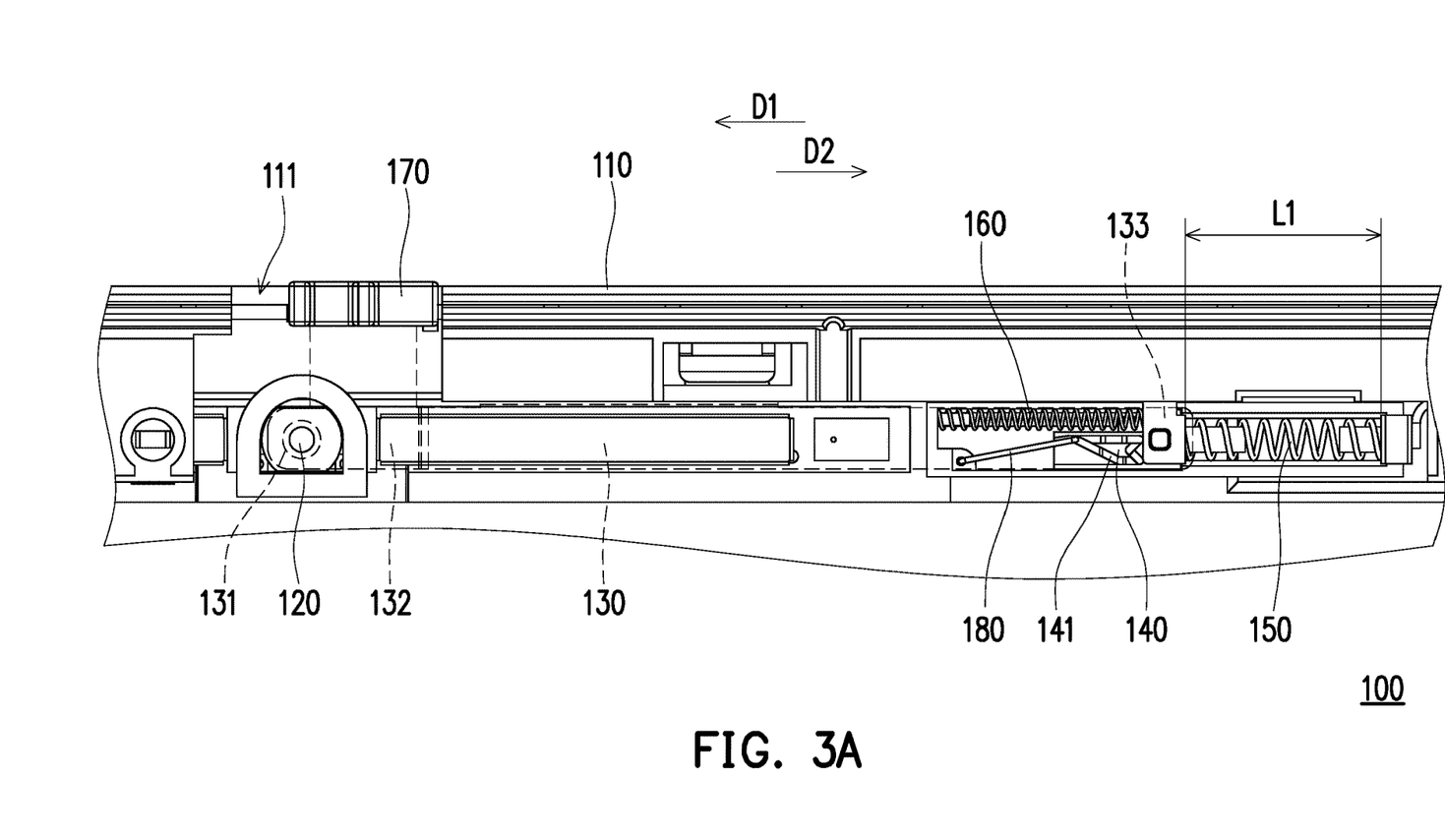
FIG. 3A is a schematic front view of the internal structure of the image capturing device of FIG. 2A.
Figure 3B:
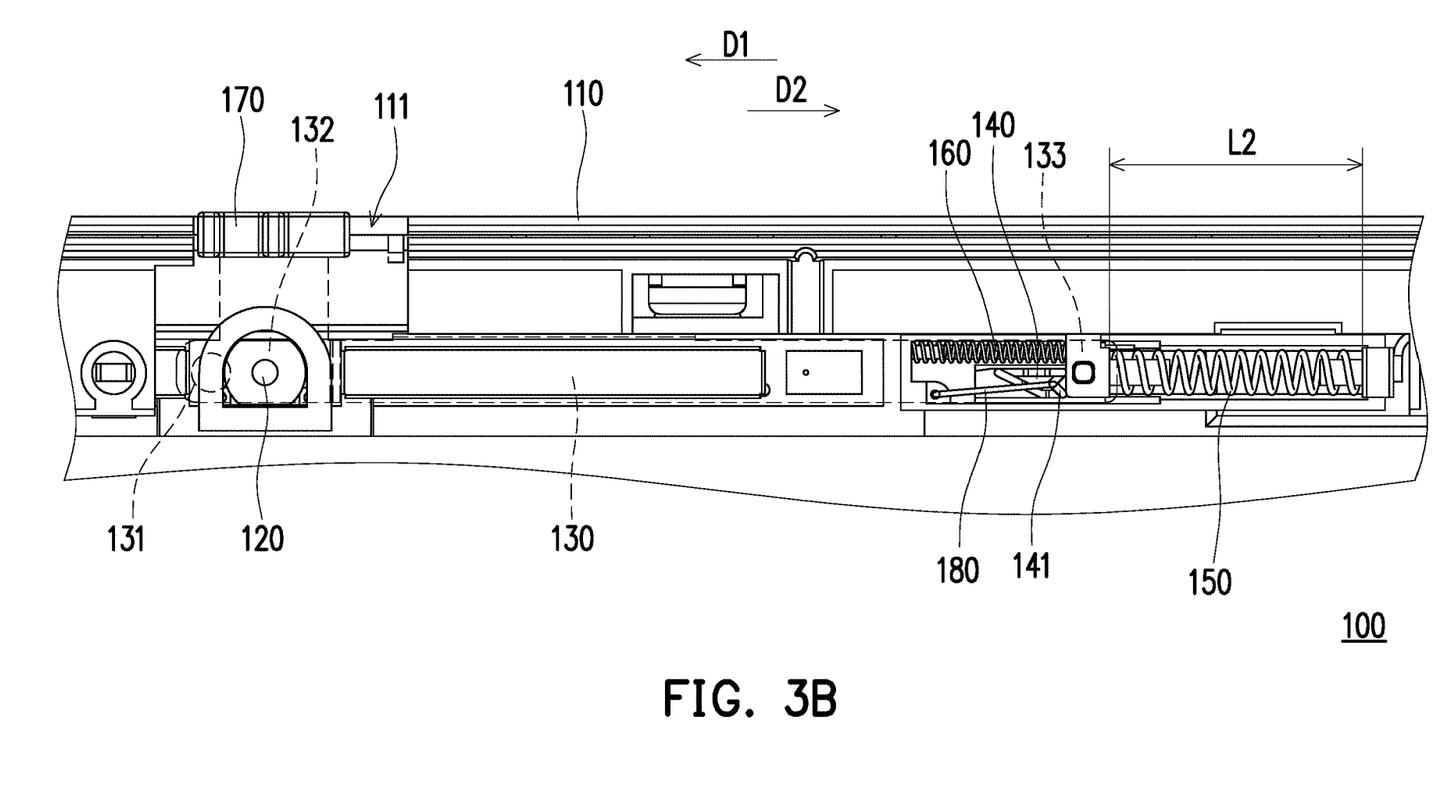
FIG. 3B is a schematic front view of the internal structure of the image capturing device of FIG. 2B.

FIG. 3A is a schematic front view of the internal structure of the image capturing device of FIG. 2A. FIG. 3B is a schematic front view of the internal structure of the image capturing device of FIG. 2B. To clearly show the configuration of the internal structure, the shielding member 130 is rendered in broken lines in FIG. 3A and FIG. 3B. Referring to FIG. 2A and FIG. 3A, in this embodiment, the image capturing device 100 further includes a positioning member 140, a memory alloy spring 150, a restoring spring 160, and a switch 170. The positioning member 140, the memory alloy spring 150, and the restoring spring 160 are all disposed in the casing 110, and the positioning member 140 is slidable with respect to the casing 110. In addition, the switch 170 is slidably disposed on the casing 110. A sidewall of the casing 110 is provided with a sliding groove 111 penetrating through the sidewall, and the switch 170 is slidably disposed in the sliding groove 111 for operation by the user.

Referring to FIG. 3A and FIG. 3B, the positioning member 140 and the switch 170 are respectively connected to two end portions of the shielding member 130, and the shielding member 130, the positioning member 140, and the switch 170 may slide synchronously with respect to the casing 110. On the other hand, the memory alloy spring 150 and the restoring spring 160 are respectively located at two opposite sides of the positioning member 140. Two ends of the memory alloy spring 150 are respectively connected to the positioning member 140 and the casing 110, and two ends of the restoring spring 160 are respectively connected to the positioning member 140 and the casing 110.

In this embodiment, the memory alloy spring 150 may be powered to extend. When the memory alloy spring 150 extends from a first length L1 to a second length L2, the memory alloy spring 150 pushes the positioning member 140 to slide in the first direction D1. At the same time, the positioning member 140 drives the shielding member 130 to slide in the first direction D1, and the shielding member 130 drives the switch 170 to slide in the first direction D1. Finally, the shielding member 130 blocks the light path of the image capturing module 120, as shown in FIG. 2B and FIG. 3B. In the closed state shown in FIG. 3B, the positioning member 140 is locked and is temporarily unable to slide with respect to the casing 110; similarly, the shielding member 130 is also temporarily unable to slide with respect to the casing 110.

On the other hand, the restoring spring 160 may be a compression spring. In the sliding process of the positioning member 140 in the first direction D1, the restoring spring 160 is compressed by the positioning member 140 and is elastically deformed, as shown in FIG. 3A and FIG. 3B. Further, the powered and extended memory alloy spring 150 may apply an elastic force to the positioning member 140 in the first direction D1 to synchronously drive the positioning member 140, the shielding member 130, and the switch 170 to slide. At the same time, the compressed and deformed restoring spring 160 may apply an elastic force to the positioning member 140 in a second direction D2, and the second direction D2 is opposite to the first direction D1.

In the open state shown in FIG. 3A, the positioning member 140 is locked and is temporarily unable to slide with respect to the casing 110; similarly, the shielding member 130 is also temporarily unable to slide with respect to the casing 110. Specifically, the memory alloy spring 150 is not powered, and the elastic force of the restoring spring 160 acting on the positioning member 140 is greater than the elastic force of the memory alloy spring 150 acting on the positioning member 140, so the memory alloy spring 150 cannot push the positioning member 140 to slide in the first direction D1.

When the memory alloy spring 150 is powered, the elastic force of the memory alloy spring 150 acting on the positioning member 140 is greater than the elastic force of the restoring spring 160 acting on the positioning member 140 to thus unlock the positioning member 140 and drive the positioning member 140, the shielding member 130, and the switch 170 to slide in the first direction D1, so that the shielding member 130 blocks the light path of the image capturing module 120, as shown in FIG. 3B. From another perspective, the memory alloy spring 150 is powered to extend to unlock the positioning member 140. In other words, the extended memory alloy spring 150 may overcome the elastic force of the restoring spring 160 acting on the positioning member 140 to drive the positioning member 140 to slide in the first direction D1. At the same time, the positioning member 140 drives the shielding member 130 to slide in the first direction D1 to block the light path of the image capturing module 120.

In the closed state shown in FIG. 3B, the positioning member 140 is locked and is temporarily unable to slide with respect to the casing 110; similarly, the shielding member 130 is also temporarily unable to slide with respect to the casing 110. In the switching process from the closed state shown in FIG. 3B to the open state shown in FIG. 3A, the memory alloy spring 150 is momentarily powered to unlock the positioning member 140, so that the positioning member 140 can slide with respect to the casing 110. After the positioning member 140 is unlocked, powering of the memory alloy spring 150 is stopped, and since the elastic force of the restoring spring 160 acting on the positioning member 140 is greater than the elastic force of the memory alloy spring 150 acting on the positioning member 140, the restoring spring 160 pushes the positioning member 140 to slide in the second direction D2, and the positioning member 140 drives the shielding member 130 to slide in the second direction D2 to unblock the light path of the image capturing module 120. At the same time, the memory alloy spring 150 is reduced from the second length L2 to the first length L1.

Referring to FIG. 2A and FIG. 3A, in this embodiment, the shielding member 130 includes a light transmitting part 131, a light shielding part 132 adjacent to the light transmitting part 131, and a positioning part 133 opposite to the light shielding part 132. The switch 170 is connected to the light shielding part 132, and the positioning member 140 is connected to the positioning part 133. For example, the light transmitting part 131 may be a hole or a structure that allows light to pass through. In the open state, the light transmitting part 131 is aligned with the image capturing module 120, so that the external light may pass through the light transmitting part 131 to be received by the image capturing module 120. As shown in FIG. 2B and FIG. 3B, in the closed state, the light shielding part 132 shields the image capturing module 120. In other words, the path of the external light entering the image capturing module 120 is blocked by the light shielding part 132.

Referring to FIG. 2A to FIG. 3B, by controlling the power-on and power-off of the memory alloy spring 150, the image capturing device 100 may be switched between the open state and the closed state and thereby exhibit excellent operating convenience.

Referring to FIG. 2A to FIG. 3B, in this embodiment, the positioning member 140, the shielding member 130, and the switch 170 may slide synchronously. When the user flips the switch 170, the switch 170 drives the positioning member 140 to slide, and the positioning member 140 drives the shielding member 130 to slide, so that the shielding member 130 blocks or unblocks the light path of the image capturing module 120.

In the open state shown in FIG. 3A, the positioning member 140 is locked and is temporarily unable to slide with respect to the casing 110; similarly, the shielding member 130 is also temporarily unable to slide with respect to the casing 110. The user may flip the switch 170 to slide in the first direction D1 to unlock the positioning member 140. At the same time, the switch 170 also drives the positioning member 140 and the shielding member 130 to slide in the first direction D1, so that the shielding member 130 blocks the light path of the image capturing module 120, as shown in FIG. 2B and FIG. 3B. In the switching process from the open state shown in FIG. 3A to the closed state shown in FIG. 3B, the restoring spring 160 is compressed by the positioning member 140 and is elastically deformed.

In the closed state shown in FIG. 3B, the positioning member 140 is locked and is temporarily unable to slide with respect to the casing 110, so the restoring spring 160 cannot push the positioning member 140 to slide in the second direction D2. Similarly, the shielding member 130 is also temporarily unable to slide with respect to the casing 110. The user may flip the switch 170 to slide in the first direction D1 to unlock the positioning member 140. Next, the switch 170 is released. Then, the restoring spring 160 pushes the positioning member 140 to slide in the second direction D2, and the positioning member 140 drives the shielding member 130 to slide in the second direction D2 to unblock the light path of the image capturing module 120, as shown in FIG. 2A and FIG. 3A.

Referring to FIG. 2A to FIG. 3B, by flipping the switch 170 or flipping and then releasing the switch 170, the image capturing device 100 may be switched between the open state and the closed state and thereby exhibit excellent operating convenience.

Further, the opening (i.e., unblocking the light path of the image capturing module 120 by the shielding member 130) and the closing (i.e., blocking the light path of the image capturing module 120 by the shielding member 130) of the image capturing device 100 may be done through multiple operation modes, so the image capturing device 100 exhibits excellent operating convenience and flexibility. Specifically, a first operation mode is an automatic switch mode in which the image capturing device 100 is opened and closed by controlling the power-on and power-off of the memory alloy spring 150 along with the assistance of the restoring spring 160. A second operation mode is a manual switch mode in which the image capturing device 100 is opened and closed by flipping the switch 170 or flipping and then releasing the switch 170 along with the assistance of the restoring spring 160. A third operation mode is a manual-closing and automatic-opening mode in which the image capturing device 100 is closed by flipping the switch 170, and the image capturing device 100 is opened by controlling the power-on and power-off of the memory alloy spring 150 along with the assistance of the restoring spring 160. A fourth operation mode is an automatic-closing and manual-opening mode in which the image capturing device 100 is closed by controlling the power-on and power-off of the memory alloy spring 150, and the image capturing device 100 is opened by flipping and then releasing the switch 170 along with the assistance of the restoring spring 160.

Figure 4A:
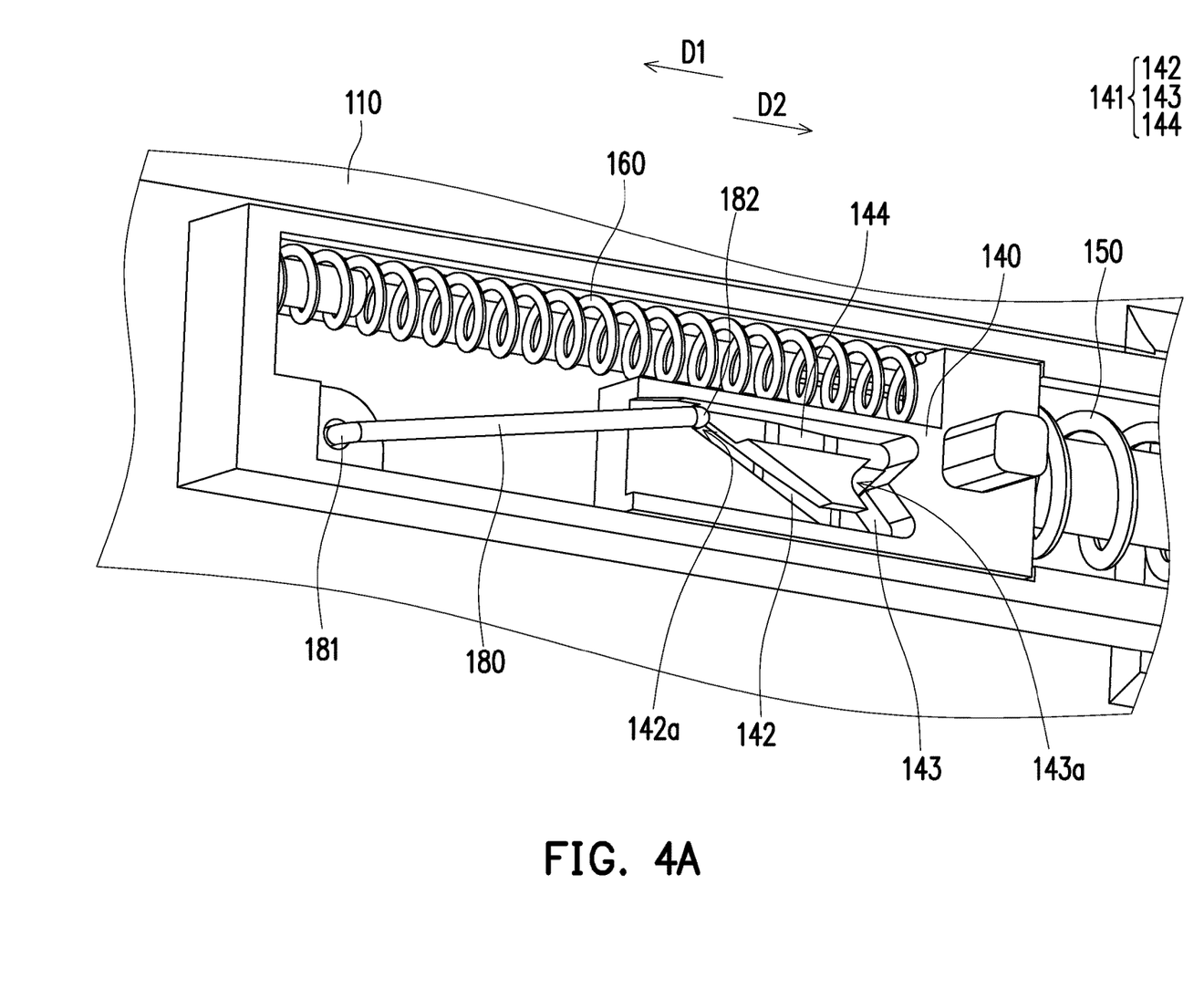
FIG. 4A is a schematic partially enlarged view of a positioning member and a positioning rod of FIG. 3A viewed from another viewing angle.
Figure 4B:
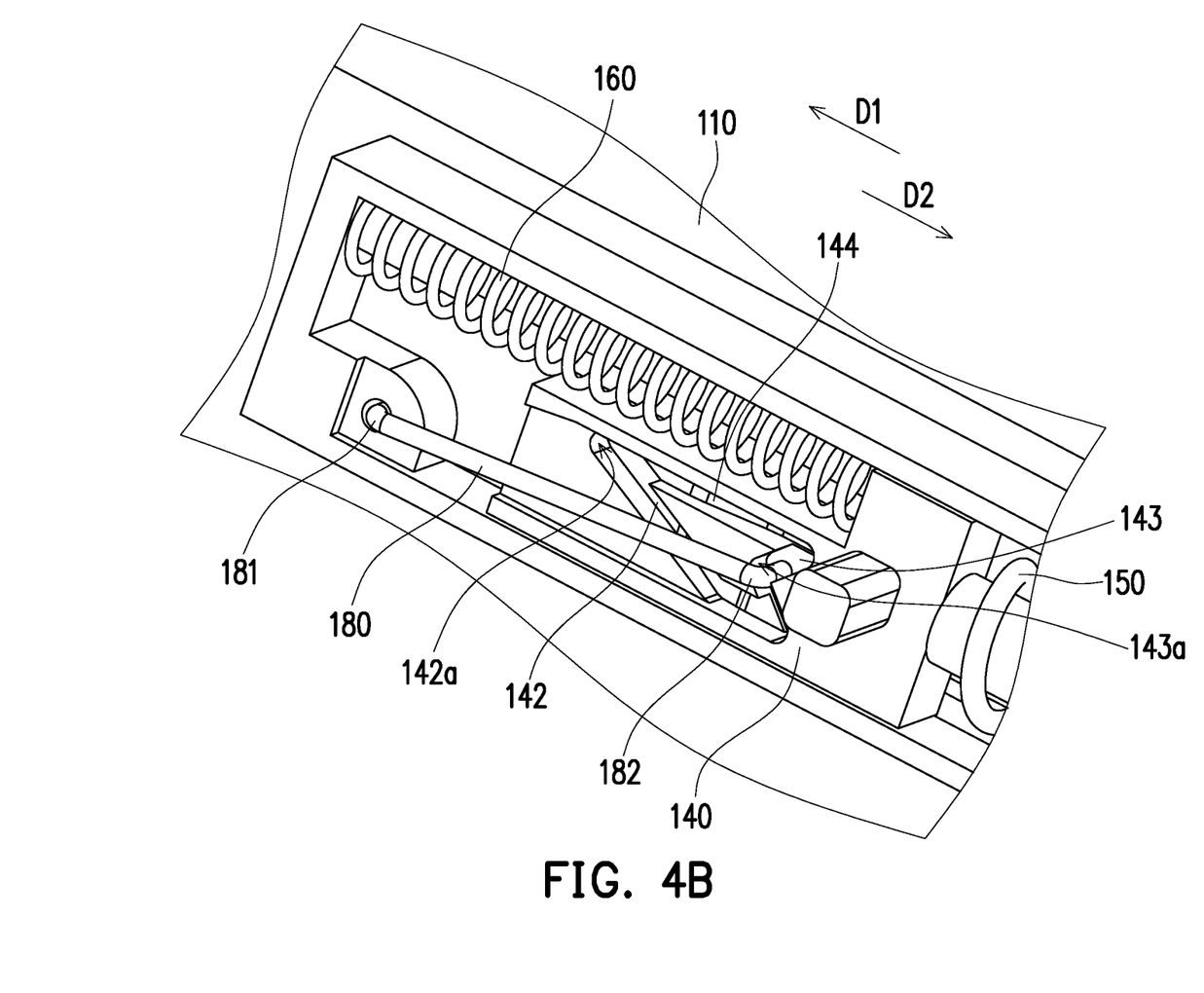
FIG. 4B is a schematic partially enlarged view of a positioning member and a positioning rod of FIG. 3B viewed from another viewing angle.

FIG. 4A is a schematic partially enlarged view of the positioning member and a positioning rod of FIG. 3A viewed from another viewing angle. FIG. 4B is a schematic partially enlarged view of the positioning member and the positioning rod of FIG. 3B viewed from another viewing angle. Referring to FIG. 3A and FIG. 4A, in this embodiment, the image capturing device 100 further includes a positioning rod 180. The positioning rod 180 is disposed in the casing 110 and has a first end 181 and a second end 182 opposite to each other. Specifically, the first end 181 of the positioning rod 180 is pivotally connected to the casing 110, and the second end 182 is slidably connected to the positioning member 140. The second end 182 of the positioning rod 180 slides on the positioning member 140 along a predetermined annular track to limit the positioning member 140 to slide reciprocatingly within a predetermined stroke.

The positioning member 140 has an annular positioning track 141, and the second end 182 of the positioning rod 180 is slidably connected in the positioning track 141. In this embodiment, the positioning track 141 includes a first track 142, a second track 143 connected to the first track 142, a third track 144 connected to the first track 142 and the second track 143. The first track 142 has a first positioning point 142a, and the second track 143 has a second positioning point 143a. On the other hand, the first positioning point 142a and the second positioning point 143a are respectively located at two opposite sides of the third track 144. The first positioning point 142a is adjacent to the junction between the first track 142 and the third track 144, and the second positioning point 143a is adjacent to the junction between the second track 143 and the third track 144.

Referring to FIG. 3A to FIG. 4B, in the sliding process of the positioning member 140 first in the first direction D1 and then in the second direction D2, the sliding path of the second end 182 of the positioning rod 180 in the positioning track 141 includes the following. The second end 182 of the positioning rod 180 slides from the first positioning point 142a along the first track 142 toward the second track 143, and then slides into the second track 143 and is locked at the second positioning point 143a. Next, the second end 182 of the positioning rod 180 slides into the third track 144 from the second positioning point 143a, and then slides along the third track 144 toward the first track 142. Finally, the second end 182 of the positioning rod 180 slides into the first track 142 and is locked at the first positioning point 142a.

Referring to FIG. 4A, there is a height difference at the junction between the first track 142 and the third track 144, and the third track 144 is higher than the first track 142. Therefore, the second end 182 of the positioning rod 180 located in the first track 142 cannot slide from the first track 142 into the third track 144. Referring to FIG. 4B, there is a height difference at the junction between the first track 142 and the second track 143, and the first track 142 is higher than the second track 143. Therefore, the second end 182 of the positioning rod 180 located in the second track 143 cannot slide from the second track 143 into the first track 142. Referring to FIG. 4B again, there is a height difference at the junction between the second track 143 and the third track 144, and the second track 143 is higher than the third track 144. Therefore, once the second end 182 of the positioning rod 180 slides into the third track 144, the second end 182 of the positioning rod 180 cannot slide from the third track 144 into the second track 143.

In the open state shown in FIG. 3A, the memory alloy spring 150 is not powered, the elastic force of the memory alloy spring 150 acting on the positioning member 140 is opposite to the elastic force of the restoring spring 160 acting on the positioning member 140, and the elastic force of the restoring spring 160 acting on the positioning member 140 is greater than the elastic force of the memory alloy spring 150 acting on the positioning member 140. In other words, the positioning member 140 is biased to slide in the second direction D2, but since the second end 182 of the positioning rod 180 structurally interferes with the positioning member 140, the second end 182 of the positioning rod 180 is locked at the first positioning point 142a of the first track 142 to prevent the positioning member 140 from sliding and ensure that the light path of the image capturing module 120 is not blocked by the shielding member 130, as shown in FIG. 2A, FIG. 3A, and FIG. 4A.

In the closed state shown in FIG. 3B, the memory alloy spring 150 is not powered, the elastic force of the memory alloy spring 150 acting on the positioning member 140 is opposite to the elastic force of the restoring spring 160 acting on the positioning member 140, and the elastic force of the restoring spring 160 acting on the positioning member 140 is greater than the elastic force of the memory alloy spring 150 acting on the positioning member 140. In other words, the positioning member 140 is biased to slide in the second direction D2, but since the second end 182 of the positioning rod 180 structurally interferes with the positioning member 140, the second end 182 of the positioning rod 180 is locked at the second positioning point 143a of the second track 143 to prevent the positioning member 140 from sliding and ensure that the shielding member 130 blocks the light path of the image capturing module 120, as shown in FIG. 2B, FIG. 3B, and FIG. 4B.

In summary of the above, in the image capturing device of the disclosure, the shielding member may block the light path of the image capturing module, so that the image capturing module cannot receive the external light. When the light path of the image capturing module is blocked by the shielding member, even if someone (e.g., a cyber hacker) breaches the image capturing device through the Internet and controls the image capturing module, they cannot remotely obtain the user's private image, so it is possible to prevent privacy leak. Furthermore, blocking or unblocking the light path of the image capturing module may be done through the automatic switch mode, the manual switch mode, the manual-closing and automatic-opening mode, or the automatic-closing and manual-opening mode, so the image capturing device exhibits excellent operating convenience and flexibility.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image capturing device comprising:
   a casing;
   an image capturing module disposed in the casing;
   a positioning member slidably disposed in the casing;
   a memory alloy spring disposed in the casing, wherein two ends of the memory alloy spring are respectively connected to the positioning member and the casing;
   a restoring spring disposed in the casing, wherein two ends of the restoring spring are respectively connected to the positioning member and the casing, and the memory alloy spring and the restoring spring are respectively located at two opposite sides of the positioning member;
   a shielding member corresponding to the image capturing module and slidably disposed in the casing, wherein the shielding member is connected to the positioning member, and in an open state, the shielding member unblocks a light path of the image capturing module, and the memory alloy spring has a first length, and in a closed state, the shielding member blocks the light path of the image capturing module, and the memory alloy spring has a second length greater than the first length; and
   a switch slidably disposed on the casing and connected to the shielding member.

2. The image capturing device according to claim 1, further comprising:
   a positioning rod disposed in the casing and having a first end and a second end opposite to each other, wherein the first end is pivotally connected to the casing, and the second end is slidably connected to the positioning member.

3. The image capturing device according to claim 2, wherein the positioning member has a positioning track, the second end is slidably connected in the positioning track, and the positioning track comprises a first track, a second track connected to the first track, and a third track connected to the first track and the second track, wherein the first track has a first positioning point, the second track has a second positioning point, and the first positioning point and the second positioning point are respectively located at two opposite sides of the third track.

4. The image capturing device according to claim 3, wherein a sliding path of the second end of the positioning rod in the positioning track comprises sliding from the first positioning point along the first track toward the second track, then sliding into the second track and being lock at the second positioning point, then sliding from the second positioning point into the third track, then sliding along the third track toward the first track, and finally sliding into the first track and being locked at the first positioning point.

5. The image capturing device according to claim 3, wherein an elastic force of the memory alloy spring acting on the positioning member is opposite to an elastic force of the restoring spring acting on the positioning member, and the elastic force of the restoring spring acting on the positioning member is greater than the elastic force of the memory alloy spring acting on the positioning member, so that the second end of the positioning rod is locked at the first positioning point, and the shielding member unblocks the light path of the image capturing module.

6. The image capturing device according to claim 3, wherein an elastic force of the memory alloy spring acting on the positioning member is opposite to an elastic force of the restoring spring acting on the positioning member, and the elastic force of the restoring spring acting on the positioning member is greater than the elastic force of the memory alloy spring acting on the positioning member, so that the second end of the positioning rod is locked at the second positioning point, and the shielding member blocks the light path of the image capturing module.

7. The image capturing device according to claim 1, wherein the memory alloy spring extends from the first length to the second length to push the positioning member, and the positioning member drives the shielding member and compresses the restoring spring, so that the shielding member blocks the light path of the image capturing module.

8. The image capturing device according to claim 1, wherein the restoring spring pushes the positioning member, and the positioning member drives the shielding member, so that the shielding member unblocks the light path of the image capturing module, and the memory alloy spring is reduced from the second length to the first length.

9. The image capturing device according to claim 1, wherein an elastic force of the memory alloy spring acting on the positioning member is opposite to an elastic force of the restoring spring acting on the positioning member, the elastic force of the memory alloy spring, when powered, acting on the positioning member is greater than the elastic force of the restoring spring acting on the positioning member, and the elastic force of the memory alloy spring, when unpowered, acting on the positioning member is less than the elastic force of the restoring spring acting on the positioning member.

10. The image capturing device according to claim 1, wherein the restoring spring comprises a compression spring.

11. The image capturing device according to claim 1, wherein the shielding member unblocks the light path of the image capturing module, and the positioning member is locked, wherein in an operation mode, a force is applied to push the switch to slide in a first direction to unlock the positioning member and drive the shielding member and the positioning member to slide in the first direction, so that the shielding member blocks the light path of the image capturing module, and in another operation mode, the memory alloy spring is powered to extend to unlock the positioning member and drive the positioning member and the shielding member to slide in the first direction, so that the shielding member blocks the light path of the image capturing module.

12. The image capturing device according to claim 1, wherein the shielding member blocks the light path of the image capturing module, the positioning member is locked, and the restoring spring is compressed, wherein in an operation mode, a force is applied to push the switch to slide in the first direction to unlock the positioning member, and then the restoring spring drives the positioning member and the shielding member to slide in a second direction opposite to the first direction, so that the shielding member unblocks the light path of the image capturing module, and in another operation mode, the memory alloy spring is powered to extend to unlock the positioning member, and then the restoring spring drives the positioning member and the shielding member to slide in the second direction opposite to the first direction, so that the shielding member unblocks the light path of the image capturing module.

13. The image capturing device according to claim 1, wherein the shielding member comprises a light transmitting part, a light shielding part adjacent to the light transmitting part, and a positioning part opposite to the light shielding part, wherein the switch is connected to the light shielding part, and the positioning member is connected to the positioning part, wherein in the open state, the light transmitting part is aligned with the image capturing module, and in the closed state, the light shielding part shields the image capturing module.

* * * * *